US011240670B2

(12) United States Patent
Helms (10) Patent No.: US 11,240,670 B2
(45) Date of Patent: Feb. 1, 2022

(54) DOMESTIC APPLIANCE COMMISSIONING (71) Applicant: Haier US Appliance Solutions, Inc., Wilmington, DE (US)

(72) Inventor: Chad Michael Helms, Lousiville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 106 days.

(21) Appl. No.: 16/802,770

(22) Filed: Feb. 27, 2020

(65) Prior Publication Data

US 2021/0274342 A1 Sep. 2, 2021

(51) Int. Cl.
| H04W 76/10 | (2018.01) |
| H04B 7/14 | (2006.01) |
| H04W 12/50 | (2021.01) |
| H04L 29/06 | (2006.01) |
| H04W 76/38 | (2018.01) |
| H04W 76/14 | (2018.01) |

(52) U.S. Cl.
CPC ........... H04W 12/50 (2021.01); H04L 63/166 (2013.01); H04W 76/14 (2018.02); H04W 76/38 (2018.02)

(58) Field of Classification Search
CPC ..... H04W 12/50; H04W 76/38; H04W 76/14; H04W 76/10; H04B 3/544; H04B 7/18558; H04L 63/166
See application file for complete search history.

(56) References Cited

U.S. PATENT DOCUMENTS

| 8,428,101 | B1 * | 4/2013 | Sarca | H04B 1/713 375/133 |
| 9,137,662 | B2 | 9/2015 | Dolenc | |
| 9,178,722 | B1 * | 11/2015 | Gong | H04L 12/6418 |
| 9,712,486 | B2 | 7/2017 | Johnson et al. | |
| 9,998,437 | B2 | 6/2018 | Kim et al. | |
| 10,070,289 | B1 | 9/2018 | Inamdar et al. | |
| 10,075,334 | B1 | 9/2018 | Kozura et al. | |
| 2010/0290414 | A1 * | 11/2010 | Yamada | H04W 16/14 370/329 |
| 2014/0082403 | A1 * | 3/2014 | Kraev | G06F 1/14 713/502 |
| 2014/0188586 | A1 * | 7/2014 | Carpenter | G06Q 20/02 705/14.23 |

(Continued)

FOREIGN PATENT DOCUMENTS

| EP | 3511628 A1 | 7/2019 |
| KR | 20180103892 A | 9/2018 |

*Primary Examiner* — Andrew Wendell
(74) *Attorney, Agent, or Firm* — Dority & Manning, P.A.

(57) ABSTRACT

A domestic appliance, as provided herein, may include a cabinet, a user input positioned on an exterior of the cabinet, and a controller configured to initiate a commissioning operation. The commissioning operation may include opening a connection channel at a wireless access point on the domestic appliance according to a predetermined initial timeout period. The commissioning operation may further include establishing communication between a remote user interface device and the wireless access point via the open connection channel within the predetermined initial timeout period. The commissioning operation may still further include, in response to establishing communication, maintaining the connection channel between the user device and the wireless access point according to a predetermined extended timeout period.

18 Claims, 5 Drawing Sheets

(56) References Cited

U.S. PATENT DOCUMENTS

2016/0315810 A1* 10/2016 Francescangeli ..... H04W 48/20
2018/0152443 A1    5/2018 Henrique Minatel et al.
2019/0052683 A1    2/2019 Logue et al.
2020/0310728 A1* 10/2020 Kawai ................... G06F 3/1292

* cited by examiner

DOMESTIC APPLIANCE COMMISSIONING

FIELD OF THE INVENTION

The present subject matter relates generally to domestic appliances that can connect to a home network or a remote network, such as the interne; and more particularly, to improved commissioning of such appliances to a user account.

BACKGROUND OF THE INVENTION

Domestic (e.g., household) appliances are generally used for a variety of tasks by a variety of users. For example, a household may include such appliances as laundry appliances (e.g., a washing machine or dryer appliance), kitchen appliances (e.g., a refrigerator, a microwave, a coffee maker, etc.), along with room air conditioners and various other appliances.

Some domestic appliances can also include features for connecting to and communicating over a secure wireless network. Such communication may provide connected features on the domestic appliances to permit the domestic appliance to communicate with a personal device, smart home systems, or a remote database such as a cloud server.

Existing domestic appliances that can connect to a secure wireless network generally require multiple processes using multiple user interfaces in order to establish a connection or association, in particular an initial connection or association, between the domestic appliance and a user account. For instance, in order to commission an appliance, a user may be required to connect an existing device, such as a phone, to the appliance via a temporary connection while the user performs certain steps on the existing device. In order to maintain the security and integrity of the appliance, the temporary connection may be configured to automatically sever or close after a programmed amount of time. Nonetheless, some users, especially less-technologically-adept individuals, may have difficult performing the necessary processes and thus need more time to perform the processes.

Accordingly, there exists a need for an appliance that can be connected to a secured wireless network and added to a user account in an easier or more secure manner.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of commissioning a domestic appliance is provided. The method may include opening a connection channel at a wireless access point on the domestic appliance according to a predetermined initial timeout period. The method may further include establishing communication between a remote user interface device and the wireless access point via the open connection channel within the predetermined initial timeout period. The method may still further include, in response to establishing communication, maintaining the connection channel between the user device and the wireless access point according to a predetermined extended timeout period.

In another exemplary aspect of the present disclosure, a domestic appliance is provided. The domestic appliance may include a cabinet, a user input positioned on an exterior of the cabinet, and a controller configured to initiate a commissioning operation. The commissioning operation may include opening a connection channel at a wireless access point on the domestic appliance according to a predetermined initial timeout period. The commissioning operation may further include establishing communication between a remote user interface device and the wireless access point via the open connection channel within the predetermined initial timeout period. The commissioning operation may still further include, in response to establishing communication, maintaining the connection channel between the user device and the wireless access point according to a predetermined extended timeout period.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally" or "about" include values within ten percent greater or less than the stated value. When used in the context of an angle or direction, such terms include within ten degrees greater or less than the stated angle or direction. For example, "generally vertical" includes directions within ten degrees of vertical in any direction.

Figure 1:
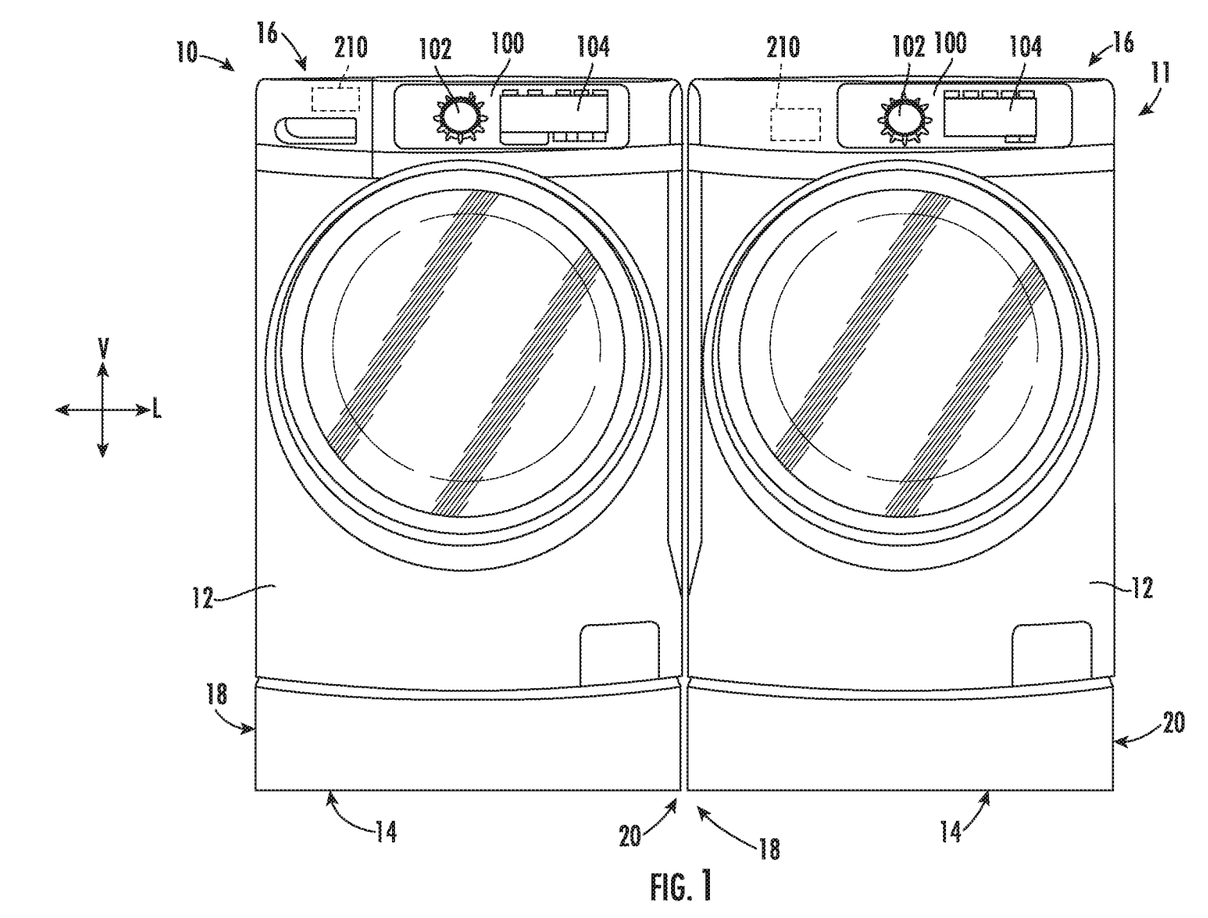
FIG. 1 provides a front, elevation view of laundry appliances in accordance with exemplary embodiments of the present disclosure.
Figure 2:
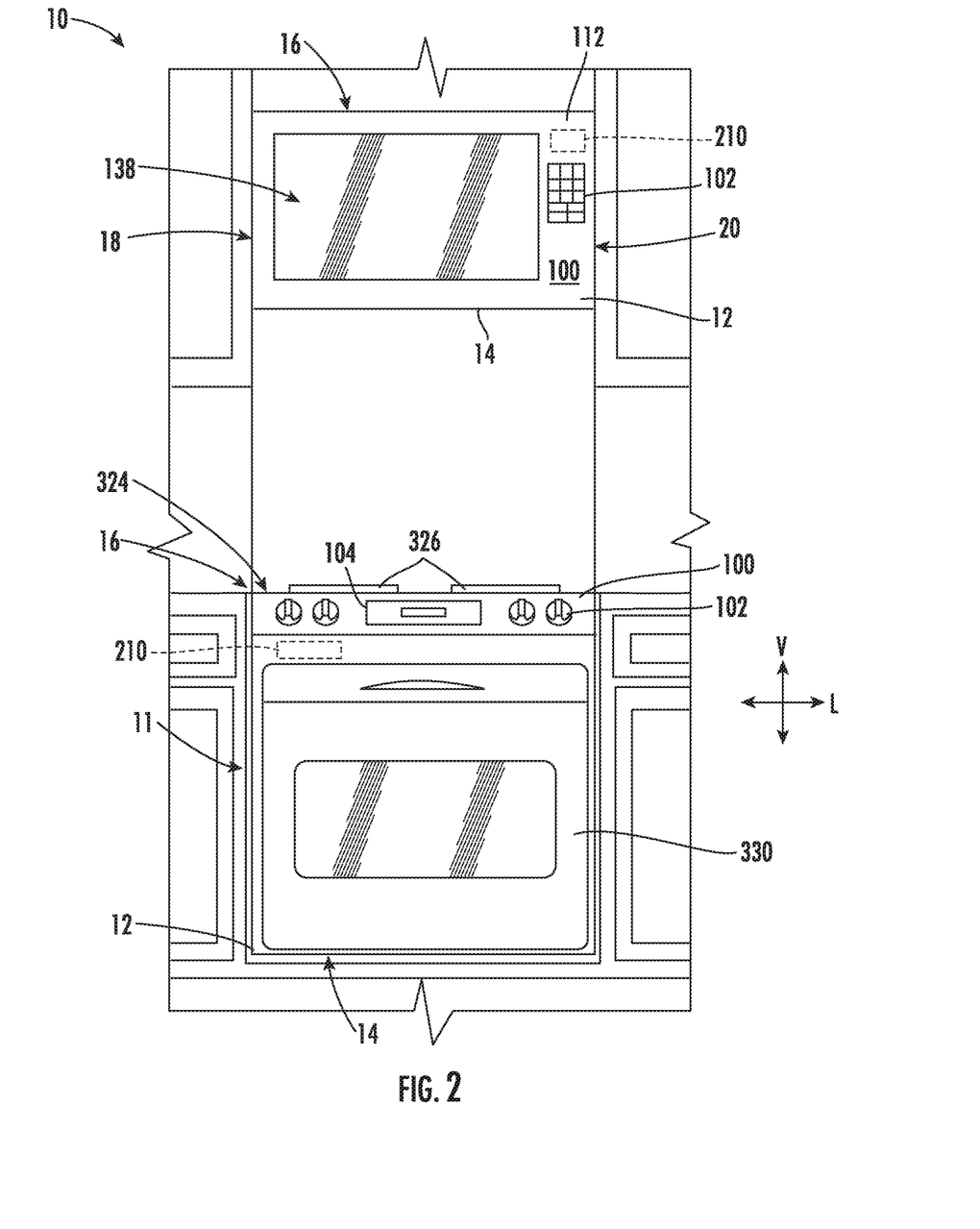
FIG. 2 provides a front, elevation view of kitchen appliances in accordance with exemplary embodiments of the present disclosure.

As may be seen in FIGS. 1 and 2, in accordance with one or more embodiments of the present disclosure, one or more appliances, such as a first appliance 10 and a second appliance 11, may be provided. The illustrated group of two appliances is provided by way of example only. Various embodiments of the present subject matter may also include only one or three or more appliances.

As generally shown throughout FIGS. 1 and 2, each appliance 10 and 11 includes a cabinet 12 that defines a vertical direction V, a lateral direction L, and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a user input device 102, which may be positioned on an exterior of the cabinet 12. The user input device 102 is generally positioned proximate to the user interface panel 100, and in some embodiments, the user input device 102 is positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, each appliance 10 and 11 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may for example provide selections for user manipulation of the operation of an appliance (e.g., via user input device 102 or display 104). In response to user manipulation of the user interface panel 100 or user input device 102, the controller 210 may operate various components of the appliance 10 or 11. Each controller 210 may include a memory and one or more microprocessors, CPUs, or the like, such as general or special purpose microprocessors operable to execute programming instructions or microcontrol code associated with operation of the appliance 10 or 11. The memory may represent random access memory such as DRAM, or read only memory such as ROM or FLASH. In some embodiments, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective appliance 10 or 11 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations, etc. and storing relevant data, as disclosed herein). It should be noted that controllers 210 as disclosed herein are capable of, and may be operable to perform, any methods and associated method steps (e.g., as, or as part of, a commissioning operation) as disclosed herein.

In some embodiments, for example, as illustrated in FIG. 1, a pair of laundry appliances may be provided as the first appliance 10 and the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliance where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

Microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components that operate to produce the electromagnetic radiation, as is generally understood. For example, the microwave oven appliance may include a magnetron (such as, for example, a cavity magnetron), a high voltage transformer, a high voltage capacitor, and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable non-metallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within the cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance where improved ease of commissioning the appliance is desired. Thus, it will be understood that the present subject matter is not limited to any particular domestic appliance.

Figure 3:
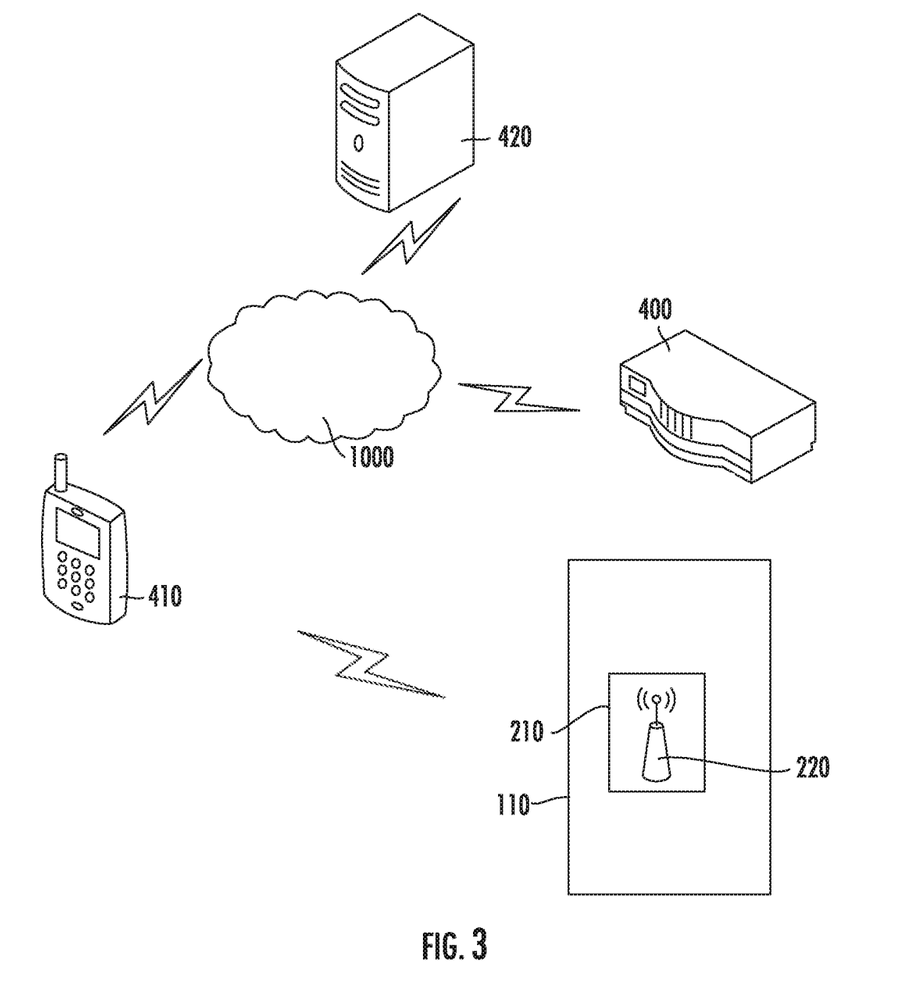
FIG. 3 provides a schematic view of an appliance being commissioned with a user device according to exemplary embodiments of the present disclosure.
Figure 4:
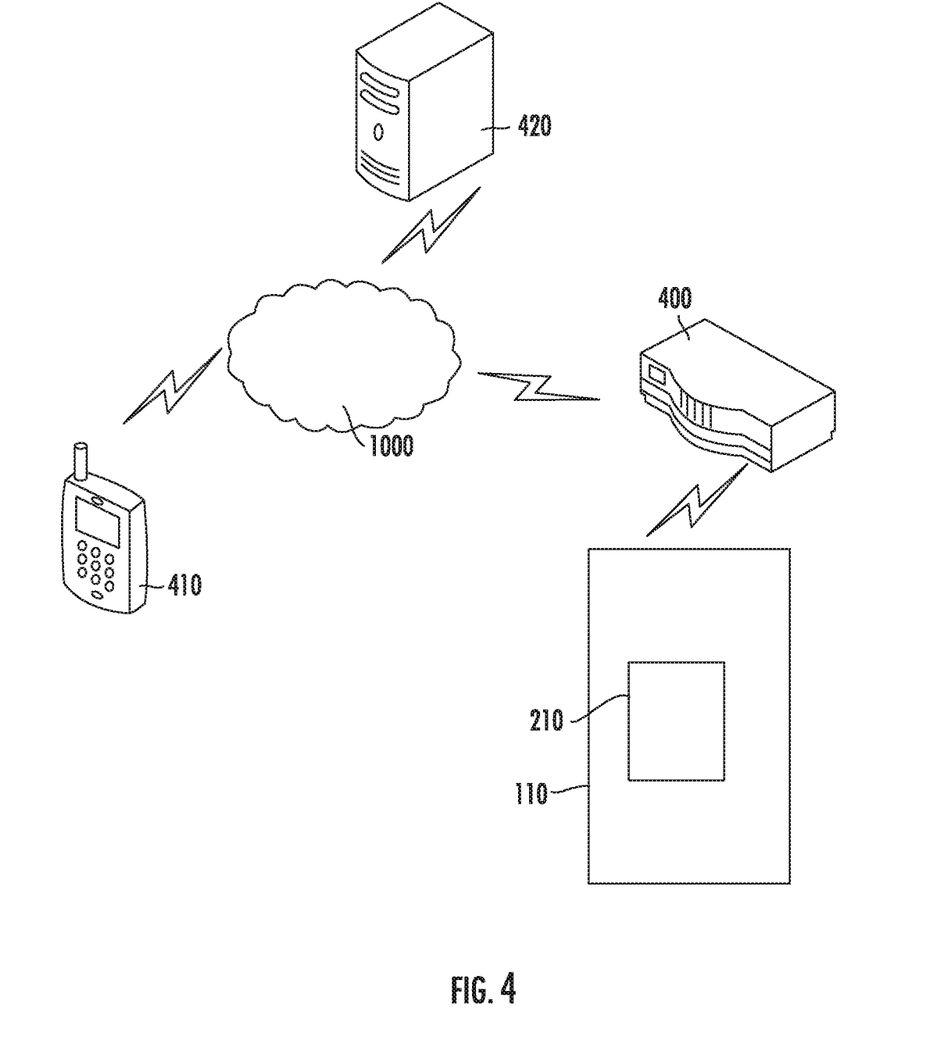
FIG. 4 provides a schematic view of an appliance prior to being commissioned according to exemplary embodiments of the present disclosure.

Turning now generally to FIGS. 3 and 4, an appliance 110 (e.g., first appliance 10 or second appliance 11—FIGS. 1 and 2) may be configured to communicate with each other or with one or more separate, external devices. For instance, controller 210 may be configured to communicate with a remote user interface device 410 or remote server 420, either directly or via one or more intermediate networks (e.g., a wide area network 1000, such as the internet). In some embodiments, the appliance 110 can access the wide area network 1000 via an access point, such as a modem or router 400, which may be part of a local, wireless network (e.g., WI-FI® or wireless network having a frequency between 1 GHz and 6 GHz).

The remote user interface device 410 may be a laptop computer, smartphone, tablet, personal computer, wearable device, smart home system, or various other suitable devices including a user interface (e.g., buttons or touchscreen display). In some embodiments, the remote user interface device 410 includes a controller having a memory (e.g., non-transitive storage media) for storing and retrieving programming instructions. For example, the remote user interface device 410 may be a smartphone operable to store and run applications (i.e., "apps") and may include a remote user interface provided as a smartphone app. During use, the appliance 110 may be in communication with the separate external device 410 or 420 through various possible communication connections and channels, such as but not limited to wireless radio frequency (RF) channels (e.g., ZIGBEE®, BLUETOOTH®, WI-FI®, etc.) or any other suitable communication connection.

Methods and systems according to the present disclosure advantageously provide an easy or secure user experience when commissioning a new appliance 110). For example, commissioning the appliance 110 may include connecting the appliance 110 to a wireless (e.g., RF, WI-FI®, etc.) network for the first time or adding the appliance 110 to a user account on the remote server 420.

FIG. 3 provides a schematic view of appliance 110 communicating with a remote user interface device 410 during a commissioning operation (e.g., for the first time). In particular, the remote user interface device 410 may communicate with the controller 210 of appliance 110, such as through a soft access point (soft AP) 220 on the controller 210.

In some embodiments, commissioning of the new appliance 110 (e.g., commissioning operation) is initiated by requesting to add the new appliance 110 to a user account and by manipulating a user input 102 (e.g., pressing a button on the user interface of new appliance 110). After the commissioning operation is initiated, the new appliance 110 may enable the soft AP 220 of the new appliance 110 (e.g., in response to manipulation of the user input 102). For instance, the soft AP 220 may open a connection channel (e.g., wireless RF channel) through which the remote user interface device 410 may connect to and communicate with the new appliance 110. Optionally, the connection channel opened at the soft AP 220 to permit only one device such that only a single, remote device may connect to the soft AP 220 at a time. In other words, the connection may be limited to a single device. In some embodiments, the soft AP 220 has a programed service set identifier (SSID) format. The SSID format may permit the remote user interface device 410 to recognize the soft AP 220 via the open connection channel. For example, the SSID format may be preprogrammed into a memory of the controller 210 and made visible to the remote user interface device 410 (e.g., such that a user can scan for and select the open connection channel at the soft AP 220 as a WI-FI® network connection).

Once recognized, the new appliance 110 may establish a secure connection with or to the remote user interface device 410 (e.g., after the soft AP 220 is selected by a user at the remote user interface device 410). For instance, the soft AP 220 may establish the secure connection with the remote user interface device 410 according to or with transport layer security (TLS) protocol. Thus, the connection channel may include a TLS protocol. Over the secure connection, the remote user interface device 410 may then receive a certificate from the new appliance 110, which supplies the soft AP 220. The certificate may subsequently be verified (e.g., by the remote user interface device 410). Additionally or alternatively, the new appliance 110 may also receive and verify a certificate from the remote user interface device 410.

In certain embodiments, the connection channel is time-restricted. Specifically, the connection channel may be subject to a timeout period (e.g., defined in seconds or minutes). Thus, the timeout period may begin to count down or run once the connection channel is opened (e.g., by enabling the soft AP 220). Once the timeout period expires, the connection channel may be closed (e.g., in response to expiration of the timeout period). For instance, the soft AP 220 may be disabled (e.g., regardless or irrespective of whether the commissioning operation has been completed).

In further embodiments, the timeout period can be varied according to a state of the soft AP 220 or progress of a user in performing portions of the commissioning operation. For instance, multiple discrete timeout periods may be provided (e.g., programmed within the controller 210). As an example, a predetermined initial timeout period and a predetermined extended timeout period for the connection channel may both be included with controller 210. The predetermined initial timeout period may be initiated once the connection channel is open and, for instance, represent the period in which the new appliance 110 can establish the secure connection with the remote user interface device 410. In other words, the predetermined initial timeout period may provide a period in which the remote user interface device 410 can recognize and select the soft AP 220. If the secure connection is not established within the initial timeout period, the connection channel may close.

Conversely, if the secure connection is established within the initial timeout period, the extended timeout period may be initiated (e.g., in place of the initial timeout period). The extended timeout period may represent the period in which the commissioning appliance 110 can be commissioned. Specifically, the extended timeout period may be the period in which the an account token or network credential must be received (e.g., from the remote user interface device 410). In other words, the extended timeout period may provide a period in which the secure connection can be maintained at the soft AP 220. If the commissioning fails (e.g., an account token or network credential is not received) within the extended timeout period, the connection channel may be closed (e.g., the soft AP 220 may be disabled).

The extended timeout period may be larger than the initial timeout period. For instance, the extended timeout period may be between six to ten times larger than the initial timeout period. Additionally or alternatively, the initial timeout period may be less than five minutes. For instance, the initial timeout period may be about two minutes. Further additionally or alternatively, the extended timeout period may be greater than fifteen minutes. For instance, the extended timeout period may be about thirty minutes.

Advantageously, the present disclosure and commissioning operation may provide a limited and secure window within which the appliance 110 is left vulnerable. Moreover, users may be able to conveniently complete the commissioning at a remote device (e.g., without being rushed or at a practical risk of running out of time).

Once connected to the remote user interface device 410, the new appliance 110 may send a device identifier (device ID) and passphrase from the appliance 110 to the server 420 via the soft access point 220 and the remote user interface device 410 (e.g., from the soft access point 220, through the remote user interface device 410, and to the server 420). In at least some embodiments, the device ID and passphrase may be sent only after establishing a secure connection and verifying the certificate of the new appliance 110. Once the device ID and the passphrase are received at the server 420, the server 420 may validate the device ID and the passphrase. After validating the device ID and passphrase, the remote server 420 may generate an account token.

The account token may be sent from the remote server 420 to the new appliance 110 via the soft AP 220 and the remote user interface device 410. For example, the server 420 may send the account token to the remote user interface device 410. The remote user interface device 410 may then relay the account token along with a network credential (e.g., a password for a local wireless network or router 400) to the new appliance 110 through the connection with the soft AP 220. In some embodiments, the account token (e.g., duplicate thereof) may also be maintained at the remote user interface device 410, such as to add the new appliance 110 to the appliances app running on the remote user interface device 410.

After receiving the network credential, the new appliance 110 may close the connection channel at the soft AP 220 and disconnect the soft AP 220 from the remote user interface device 410. For instance, the soft AP 220 may be disabled. After closing the connection channel or disabling the soft AP 220, the new appliance 110 may connect directly to the local network. For instance, the new appliance 110 may connect directly to the user's home WI-FI® network via the router 400, as illustrated in FIG. 4. Once connected directly to the router 400, the new appliance 110 may then connect to the remote server 420 via the router 400. Additionally or alternatively, the new appliance 110 (e.g., controller 210) may use the account token to verify or permit the connection to the remote server 420. The server 420 may then associate the new appliance 110 with the user account.

Figure 5:
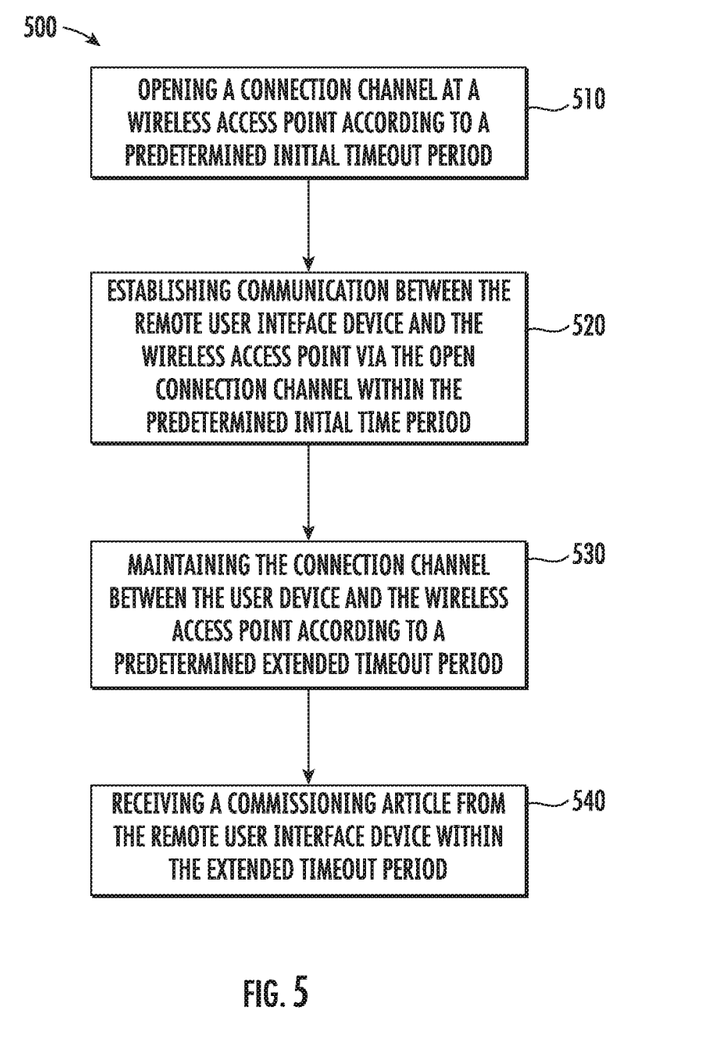
FIG. 5 provides a flow chart illustrating a method of commissioning an appliance according to exemplary embodiments of the present disclosure.

Turning now to FIG. 5, various methods may be provided for use of a system or appliance (e.g., new appliance 110) in accordance with the present disclosure. In general, the various steps of methods as disclosed herein may, in exemplary embodiments, be performed by the controller 210 as part of an operation that the controller 210 is configured to initiate (e.g., a commissioning operation). During such methods, controller 210 may receive inputs and transmit outputs from various other components of the appliance 110 or separate external device 410 or 420. In particular, the present disclosure is further directed to methods, such as commissioning a domestic appliance (e.g., new appliance 110). In certain embodiments, such methods may advantageously facilitate connecting an appliance to a secured wireless network (e.g., local network through a router 400) or added to a user account in an easy and secure manner.

At 510, the method 500 includes opening a connection channel at a wireless access point on the domestic appliance according to a predetermined initial timeout period. As described above, opening the connection channel may include enabling a wireless access point (e.g., soft AP) such that a remote user interface device may scan for and identify the wireless access point. For instance, the wireless access point may be identified by the SSID format. In some embodiments, the connection channel is a single-device channel. Thus, only a single device may be permitted to connected to the wireless access point at any one time. In additional or alternative embodiments, the connection channel includes a transport layer security (TLS) protocol. Moreover, as described above, the wireless access point may be configured to close the open connection channel in response to expiration of the initial timeout period if no communication is established (i.e., wherein no communication is established on the open connection channel within the initial timeout period).

At 520, the method 500 includes establishing communication between the remote user interface device and the wireless access point via the open connection channel within the predetermined initial timeout period. For instance, once the connection channel is recognized and prior to the predetermined initial timeout period expiring, the remote user interface device may select the open connection channel. Thus, communication signals may be transmitted between the domestic appliance (e.g., at the wireless access point) and the remote user interface device.

At 530, the method 500 includes, in response to establishing communication, maintaining the connection channel between the user device and the wireless access point according to a predetermined extended timeout period. As described above, the extended period timeout period may be larger than the initial timeout period. In other words, the connection channel may be permitted to remain longer than the time in which communication must be established (e.g., at 520). Moreover, as further described above, the wireless access point may be configured to close the connection channel (e.g., disable communication via the wireless access point or soft AP) in response to expiration of the extended timeout period.

At 540, the method 500 includes receiving a commissioning article from the remote user interface device within the extended timeout period. For instance, a network credential or account token may be received, as described above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of commissioning a domestic appliance, the method comprising:
   opening a connection channel at a wireless access point on the domestic appliance according to a predetermined initial timeout period;
   establishing communication between a remote user interface device and the wireless access point via the open connection channel within the predetermined initial timeout period; and
   maintaining, in response to establishing communication, the connection channel between the user device and the wireless access point according to a predetermined extended timeout period.

2. The method of claim 1, wherein the connection channel is limited to a single device.

3. The method of claim 1, wherein the extended timeout period is larger than the initial timeout period.

4. The method of claim 3, wherein the extended timeout period is between six to ten times larger than the initial timeout period.

5. The method of claim 3, wherein the initial timeout period is about two minutes.

6. The method of claim 3, wherein the extended timeout period is about thirty minutes.

7. The method of claim 1, wherein the wireless access point is configured to close the open connection channel in response to expiration of the initial timeout period wherein no communication is established.

8. The method of claim 1, wherein the connection channel comprises a transport layer security protocol.

9. The method of claim 1, further comprising receiving a network credential from the remote user interface device via the connection channel within the extended timeout period.

10. A domestic appliance comprising:
    a cabinet;
    a user input positioned on an exterior of the cabinet; and
    a controller configured to initiate a commissioning operation, the commissioning operation comprising
       opening a connection channel at a wireless access point on the domestic appliance according to a predetermined initial timeout period,
       establishing communication between the remote user interface device and the wireless access point via the open connection channel within the predetermined initial timeout period, and
       maintaining, in response to establishing communication, the connection channel between the user device and the wireless access point according to a predetermined extended timeout period.

11. The domestic appliance of claim 10, wherein the connection channel is limited to a single device.

12. The domestic appliance of claim 10, wherein the extended timeout period is larger than the initial timeout period.

13. The domestic appliance of claim 12, wherein the extended timeout period is between six to ten times larger than the initial timeout period.

14. The domestic appliance of claim 12, wherein the initial timeout period is about two minutes.

15. The domestic appliance of claim 12, wherein the extended timeout period is about thirty minutes.

16. The domestic appliance of claim 10, wherein the wireless access point is configured to close the open connection channel in response to expiration of the initial timeout period wherein no communication is established.

17. The domestic appliance of claim 10, wherein the connection channel comprises a transport layer security protocol.

18. The domestic appliance of claim 10, wherein the commissioning operation further comprises receiving a network credential from the remote user interface device via the connection channel within the extended timeout period.

* * * * *